United States Patent
Singh et al.

(10) Patent No.: US 8,772,189 B2
(45) Date of Patent: Jul. 8, 2014

(54) GLASS FRIT COMPOSITIONS FOR ENAMELS

(75) Inventors: Sandeep K. Singh, Strongsville, OH (US); George E. Sakoske, Washington, PA (US); David A. Klimas, Pittsburgh, PA (US)

(73) Assignee: Ferro Corporation, Cleveland, OH (US)

( * ) Notice: Subject to any disclaimer, the term of this patent is extended or adjusted under 35 U.S.C. 154(b) by 583 days.

(21) Appl. No.: 13/100,399

(22) Filed: May 4, 2011

(65) Prior Publication Data

US 2012/0282407 A1 Nov. 8, 2012

(51) Int. Cl.
*C03C 8/04* (2006.01)
*C03C 8/06* (2006.01)
*C03C 8/14* (2006.01)
*C03C 8/18* (2006.01)
*C03C 8/20* (2006.01)

(52) U.S. Cl.
CPC ... *C03C 8/04* (2013.01); *C03C 8/06* (2013.01); *C03C 8/14* (2013.01); *C03C 8/18* (2013.01); *C03C 8/20* (2013.01)
USPC .................. 501/26; 501/25; 501/32

(58) Field of Classification Search
CPC ........ C03C 3/093; C03C 3/115; C03C 3/118; C03C 8/04; C03C 8/06; C03C 8/14; C03C 8/18; C03C 8/20
USPC .......................................... 501/21, 25, 26, 32
See application file for complete search history.

(56) References Cited

U.S. PATENT DOCUMENTS

| | | |
|---|---|---|
| 4,029,605 A | 6/1977 | Kosiorek |
| 4,098,949 A | 7/1978 | Kosiorek |
| 4,224,074 A | 9/1980 | Reade |
| 4,312,951 A | 1/1982 | Eppler |
| 4,376,169 A | 3/1983 | Eppler |
| 4,446,241 A | 5/1984 | Francel et al. |
| 4,537,862 A | 8/1985 | Francel et al. |
| 4,554,258 A | 11/1985 | Francel |
| 4,596,590 A | 6/1986 | Boaz |
| 4,684,389 A | 8/1987 | Boaz |
| 4,770,685 A | 9/1988 | Boaz |
| 4,822,396 A | 4/1989 | Reinherz et al. |
| 4,828,596 A | 5/1989 | Reinherz |
| 4,857,096 A | 8/1989 | Boaz |
| 4,892,847 A | 1/1990 | Reinherz |
| 4,959,090 A | 9/1990 | Reinherz |
| 4,970,178 A | 11/1990 | Klimas et al. |
| 4,983,196 A | 1/1991 | Stotka |
| 5,037,783 A | 8/1991 | Boaz |
| 5,093,285 A | 3/1992 | Murkens |
| 5,141,969 A | 8/1992 | Saeva et al. |
| 5,153,150 A | 10/1992 | Ruderer et al. |
| 5,203,902 A | 4/1993 | Murkens |
| 5,208,191 A | 5/1993 | Ruderer et al. |
| 5,252,521 A | 10/1993 | Roberts |
| 5,308,803 A | 5/1994 | Clifford et al. |
| 5,504,045 A | 4/1996 | Emlemdi et al. |
| 5,559,059 A | 9/1996 | Ryan |
| 5,578,533 A | 11/1996 | Manabe et al. |
| 5,629,247 A | 5/1997 | Prunchak |
| 5,827,790 A | 10/1998 | Evans et al. |
| 8,007,930 B2 * | 8/2011 | Sakoske .................. 428/701 |
| 2010/0009836 A1 * | 1/2010 | Sakoske .................. 501/14 |
| 2010/0009837 A1 * | 1/2010 | Sakoske .................. 501/18 |

FOREIGN PATENT DOCUMENTS

EP        0201241         12/1986

* cited by examiner

*Primary Examiner* — Karl Group
(74) *Attorney, Agent, or Firm* — Rankin, Hill & Clark LLP

(57) ABSTRACT

This invention relates to glass and enamel compositions. The glass compositions comprise $SiO_2$, $Cs_2O$, $Na_2O$, ZnO, $B_2O_3$, and $TiO_2$, and optionally $Bi_2O_3$ and F. The resulting compositions can be used to form an enamel on a substrate, for example, to decorate and/or protect the substrate.

19 Claims, No Drawings

US 8,772,189 B2

GLASS FRIT COMPOSITIONS FOR ENAMELS

TECHNICAL FIELD

This invention relates to glass and enamel compositions, methods of forming enamel compositions, and methods of forming an enamel on a substrate.

BACKGROUND

Lead-free and cadmium-free glass compositions are generally used to form glass frits which are, in turn, used to formulate glass enamel compositions. These glass/glass ceramic enamel compositions are useful for forming decorative coatings for glassware, chinaware, architectural glass and the like. They are especially useful in forming colored borders around glass sheets used for automotive windshields, sidelights, and backlights. These colored borders enhance the appearance as well as prevent UV degradation of underlying adhesives.

In general, these enamel compositions contain a glass frits, a colorant and an organic vehicle. They are applied to a desired substrate and subsequently fired to burn off the organic vehicle and fuse the frit, thus bonding the enamel coating to the substrate.

For example, automotive designs employ a black glass-ceramic enamel obscuration band around the periphery of glass windshields to hide unevenness and protect the underlying adhesive from ultraviolet degradation. Architectural, appliance, and container/dishware glass applications often include glass ceramic materials for decorative purposes.

With glass frit development there is usually a compromise involved with the final properties of the frit. In general, glass frits that have low melting ranges have average chemical durability and relatively high thermal expansions, while frits with high melting ranges have above average/excellent durability and relatively low thermal expansion. Therefore, a need exits to formulate a glass and glass enamel compositions having low firing, low expansion, and good chemical durability. Such glasses and glass enamels have been developed, which have low firing, acceptable chemical durability and reasonable expansion, but they typically require the toxic lead oxide.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one aspect, an enamel composition is provided. More particularly, in accordance with this aspect, the enamel composition includes a solid portion including a frit portion. The frit portion includes, prior to firing: about 30 to about 50 wt % of $SiO_2$; about 4.5 to about 20.2 wt % of $Cs_2O$; about 6.1 to about 11.5 wt % of $Na_2O$; about 6.5 to about 20.2 wt % of $B_2O_3$; about 8 to about 25 wt % of ZnO; about 3.4 to about 12.3 wt % of $TiO_2$; about 0 to about 40 wt % of $Bi_2O_3$; and about 0 to about 7 wt % of F.

In accordance with another aspect, a method for forming an enamel composition is provided. More particularly, in accordance with this aspect, the method involves combining about 30 to about 50 wt % of $SiO_2$; about 4.5 to about 20.2 wt % of $Cs_2O$; about 6.1 to about 11.5 wt % of $Na_2O$; about 6.5 to about 20.2 wt % of $B_2O_3$; about 8 to about 25 wt % of ZnO; about 3.4 to about 12.3 wt % of $TiO_2$; about 0 to about 40 wt % of $Bi_2O_3$; and about 0 to about 7 wt % of F.

In accordance with yet another aspect, a method of forming an enamel on a substrate. More particularly, in accordance with this aspect, the method involves providing an enamel composition on the substrate, the enamel composition containing a solid portion, the solid portion containing a frit portion, the frit portion containing, prior to firing: about 30 to about 50 wt % of $SiO_2$; about 4.5 to about 20.2 wt % of $Cs_2O$; about 6.1 to about 11.5 wt % of $Na_2O$; about 6.5 to about 20.2 wt % of $B_2O_3$; about 8 to about 25 wt % of ZnO; about 3.4 to about 12.3 wt % of $TiO_2$; about 0 to about 40 wt % of $Bi_2O_3$; and about 0 to about 7 wt % of F; and firing the enamel composition and the substrate at a temperature sufficient to adhere the enamel composition to the substrate.

To the accomplishment of the foregoing and related ends, the invention, then, involves the features hereinafter fully described and particularly pointed out in the claims. The following description set forth in detail certain illustrative embodiments of the invention. These embodiments are indicative, however, of but a few of the various ways in which the principles of the invention may be employed. Other objects, advantages and novel features of the invention will become apparent from the following detailed description of the invention.

DETAILED DESCRIPTION OF THE INVENTION

Glass sheets for automotive use are generally coated with the ceramic enamel composition and then subjected to a forming process at elevated temperatures. During this treatment the enamel melts and fuses to the glass substrate and the glass is formed into a desired final shape. However, conventional coatings exhibit a tendency to adhere to the material covering the forming die, such as a fiberglass or metal fiber covered die, because these conventional enamels have a low viscosity after melting and stick to other materials at high temperature. Accordingly, these materials are not suitable for use in glass forming processes in which the heated glass coated with enamel contacts a material-covered forming die.

Various approaches have been suggested in order to facilitate the forming of glass sheets with a ceramic enamel coated thereon, withstanding of the elevated bending or forming temperatures, and repeated contact of the glass sheet and the covered forming die without the enamel adhering to the forming die. For example, bismuth oxide-containing formulations have been proposed.

However, certain of the bismuth containing systems produce a weak glass, such as when lithium is present, and have poor silver bleed-through properties, as well as inadequate anti-stick properties. As a further problem, a number of conventional ceramic enamel systems employ a lead-containing glass frit. For environmental considerations it is desirable to avoid the use of any lead-containing system. Currently, many of the lead-free glass frits suitable for automotive enamel use lithium ions. If not carefully controlled, however, the use of lithium can cause undesirable stresses and substrate breakage.

Also, while some of the conventional enamel systems may perform fairly well in conventional glass forming processes, some are not satisfactory for use in newly-developed "deep bend" processes for forming automotive glass. It is essential that the enamel compositions also possess adequate resistance to certain chemical agents, which they may contact, and many of the prior art compositions fail in this respect.

Conventional enamel compositions suffer from one or more of the deficiencies noted above, making it desirable to provide a composition which avoids these shortcomings. The present invention provides such ceramic enamel compositions, a method for employing the compositions, and substrates coated therewith.

The present invention provides a glass composition and glass frit produced therefrom which can be used in producing enamels. In particular, the invention relates to glass frit compositions, and glasses, ceramics, and enamels made therefrom, which include $SiO_2$, $Cs_2O$, $Na_2O$, $B_2O_3$, ZnO, and $TiO_2$, and optionally $Bi_2O_3$ and F. The glass frits can have one or more of the following advantages: improved chemical durability (e.g., good acid resistance); low thermal expansion coefficient (TEC) (e.g., <8.5 ppm/° C.); and relatively low firing temperatures (e.g., <1100° F.).

Enamel compositions of the invention include a glass frit portion, which in turn includes a combination of the oxides of silicon, cesium, sodium, boron, zinc, and titanium, and optionally bismuth oxides and fluoride ion.

The components of the inventive compositions, articles and methods are detailed herein below. Compositional percentages are by weight. Certain embodiments of the invention are envisioned where at least some percentages, temperatures, times, and ranges of other values are preceded by the modifier "about." All compositional percentages are by weight and are given for a blend prior to firing. Details on each ingredient follow.

Frit (Glass) Component

The glass frit portions of the glass include $SiO_2$, $Cs_2O$, $Na_2O$, $B_2O_3$, ZnO, and $TiO_2$. The frit portions can optionally include $Bi_2O_3$ and F. The frit portions herein include $SiO_2$: broadly 30-50 wt %, preferably 32-48 wt % and more preferably 34-38 wt %; $Cs_2O$: broadly 4.5-20.2 wt %; preferably 5.5-18.5 wt % and more preferably 6.5-16.5 wt %; $Na_2O$: broadly 6.1-11.5 wt %; preferably 7.5-11.3 wt % and more preferably 8.5-11.1 wt %; $B_2O_3$: broadly 6.5-20.2 wt %; preferably 7.5-18.5 wt % and more preferably 8-16.5 wt %; ZnO: broadly 8-25 wt %; preferably 9-23 wt % and more preferably 10-20 wt %; $TiO_2$: broadly 3.4-12.3 wt %; preferably 4.3-11.3 wt % and more preferably 5.5-10.3 wt %; $Bi_2O_3$: broadly 0-40 wt %; preferably 5-35 wt % and more preferably 10-20 wt %; and F: broadly 0-7 wt %; preferably 1.5-6.5 wt % and more preferably 2.5-5.5 wt %.

In one embodiment, the frit portions include, prior to firing, about 30 to about 50 wt % of $SiO_2$; about 4.5 to about 20.2 wt % of $Cs_2O$; about 6.1 to about 11.5 wt % of $Na_2O$; about 6.5 to about 20.2 wt % of $B_2O_3$; about 8 to about 25 wt % of ZnO; about 3.4 to about 12.3 wt % of $TiO_2$; about 0 to about 40 wt % of $Bi_2O_3$; and about 0 to about 7 wt % of F. In another embodiment, the frit portions include, prior to firing, about 32 to about 48 wt % of $SiO_2$; about 5.5 to about 18.5 wt % of $Cs_2O$; about 7.5 to about 11.3 wt % of $Na_2O$; about 7.5 to about 18.5 wt % of $B_2O_3$; about 9 to about 23 wt % of ZnO; about 4.3 to about 11.3 wt % of $TiO_2$; about 5 to about 35 wt % of $Bi_2O_3$; and about 1.5 to about 6.5 wt % of F. In yet another embodiment, the frit portions include, prior to firing, about 34 to about 38 wt % of $SiO_2$; about 6.5 to about 16.5 wt % of $Cs_2O$; about 8.5 to about 11.1 wt % of $Na_2O$; about 8 to about 16.5 wt % of $B_2O_3$; about 10 to about 20 wt % of ZnO; about 5.5 to about 10.3 wt % of $TiO_2$; about 10 to about 20 wt % of $Bi_2O_3$; and about 2.5 to about 5.5 wt % of F.

Other embodiments are possible, using, for example, a combination of ranges of oxides indicated hereinabove as "broad," "preferred," and "more preferred" in various combinations, so long as such combinations of ranges can add up to 100 wt %. For example, the glass frit compositions include, prior to firing, about 30 to about 50 wt % of $SiO_2$; about 5.5 to about 18.5 wt % of $Cs_2O$; about 8.5 to about 11.1 wt % of $Na_2O$; about 6.5 to about 20.2 wt % of $B_2O_3$; about 9 to about 23 wt % of ZnO; about 5.5 to about 10.3 wt % of $TiO_2$; about 0 to about 40 wt % of $Bi_2O_3$; and about 1.5 to about 6.5 wt % of F. In another embodiment, the glass frit compositions include, prior to firing, about 32 to about 48 wt % of $SiO_2$; about 6.5 to about 16.5 wt % of $Cs_2O$; about 6.1 to about 11.5 wt % of $Na_2O$; about 7.5 to about 18.5 wt % of $B_2O_3$; about 10 to about 20 wt % of ZnO; about 3.4 to about 12.3 wt % of $TiO_2$; about 5 to about 35 wt % of $Bi_2O_3$; and about 2.5 to about 5.5 wt % of F. In yet another embodiment, the glass frit compositions include, prior to firing, about 34 to about 38 wt % of $SiO_2$; about 4.5 to about 20.2 wt % of $Cs_2O$; about 7.5 to about 11.3 wt % of $Na_2O$; about 8 to about 16.5 wt % of $B_2O_3$; about 8 to about 25 wt % of ZnO; about 4.3 to about 11.3 wt % of $TiO_2$; about 10 to about 20 wt % of $Bi_2O_3$; and about 0 to about 7 wt % of F.

Secondary, optional oxides can be added to frits according to the formulations in the preceding two paragraphs. In one embodiment, at least one oxide selected from the group consisting of $La_2O_3$: broadly 0.1-1 wt %, preferably 0.3-1 wt %, more preferably 0.5-1 wt %; $Nb_2O_5$: broadly 0.1-1 wt %, preferably 0.3-1 wt %, more preferably 0.5-1 wt %; $MnO_2$: broadly 0.1-1 wt %, preferably 0.3-1 wt %, more preferably 0.5-1 wt %; $CeO_2$: broadly 0.1-1 wt %, preferably 0.3-1 wt %, more preferably 0.5-1 wt %; $MoO_3$: broadly 0.1-1 wt %, preferably 0.3-1 wt %, more preferably 0.5-1 wt %; and $WO_3$: broadly 0.1-1 wt %, preferably 0.3-1 wt %, more preferably 0.5-1 wt % is added to the frit portions. In one embodiment, the total amount of the secondary oxides is about 0.1 to about 5 wt % of the frit portion. Combinations of ranges of secondary oxides indicated hereinabove as "broad," "preferred," and "more preferred" in various combinations are possible, so long as such combinations of ranges can add up to 5 wt % of the frit portion. Addition of these oxides can improve melt ability and/or adhesion of the enamel composition.

Additional oxides can be added to any previously described embodiment to improve chemical resistance of the enamel composition. In one embodiment, at least one selected the group consisting of $Al_2O_3$: broadly 0.1-4 wt %, preferably 0.5-4 wt %, more preferably 1-4 wt %; and BaO: broadly 0.1-3 wt %, preferably 0.5-3 wt %, more preferably 1-3 wt % is added to the frit portions.

As can be seen above, the composition of the glass frits useful in this invention can be adapted over a broad range of oxide compositions. Glasses can be formulated according to the principal glass and enamel compositions above, together with, optionally one or more secondary and/or additional oxides. The frit compositions can be used to form glass enamel compositions.

The glass frits can be formed by any suitable techniques. In one embodiment, the glass frits are formed by blending the starting materials (e.g., oxides and optionally fluoride) and melting together at a temperature of about 2000 to about 2400° F. for about 45 to about 75 minutes to form a molten glass having the desired composition. The molten glass formed can then be suddenly cooled by any suitable technique including water quenching to form a frit. The frit can then be ground using, for example, milling techniques to a fine particle size, from about 1 to about 8 microns, preferably 2 to about 6 microns, and more preferably about 3 to about 5 microns.

In one embodiment, the frit portions are substantially free of at least one of the elements selected from the group consisting of lead, cadmium, and bismuth. In another embodiment, the subject frit portions are substantially free of lead and cadmium, but the frit portions include bismuth. As used herein, "substantially free of an element" means that the frit portions do not include the element in any form, or the element or any compounds that contain the element are not intentionally added to the frit portions. For example, in some embodiments, all the materials used in forming the frit portions are substantially free of at least one of the elements selected from the group consisting of lead, cadmium, and bismuth. In another embodiment, a method of making the frit portions does not involve combining at least one of the elements selected from the group consisting of lead, cadmium, and bismuth with the frit portions and/or precursor materials of the frit portions.

The frit portions can have advantageously a low thermal expansion coefficient (TEC) from 25° C. to 300° C. The method of determining the TEC is described in detail below. In one embodiment, the frit portions have about $8.5 \times 10^{-6\circ}$ C.$^{-1}$ or less of TEC. In another embodiment, the frit portions have about $8.3 \times 10^{-6\circ}$ C.$^{-1}$ or less of TEC. In yet another embodiment, the frit portions have about $8.0 \times 10^{-6\circ}$ C.$^{-1}$ or less of TEC. In still yet another embodiment, the frit portions have about $7.8 \times 10^{-6\circ}$ C.$^{-1}$ or less of TEC. In another embodiment, the frit portions have about $7.6 \times 10^{-6\circ}$ C.$^{-1}$ or less of TEC. In one embodiment, the frit portions have about $5 \times 10^{-6\circ}$ C.$^{-1}$ or more.

The frit portions can have advantageously a low firing temperature. The firing temperature is the temperature where the glass frit has sufficient time to flow and fuse within a 15 minute fire and yield a glossy smooth surface. In one embodiment, the frit portions have about 1100° F. or less of firing temperature. In another embodiment, the frit portions have about 1080° F. or less of firing temperature. In yet another embodiment, the frit portions have about 1060° F. or less of firing temperature.

Enamel Composition

The enamel compositions can include the glass frit compositions and vehicle with the optional presence of a pigment such as a metal oxide pigment, as described in detail below. In one embodiment, the enamel compositions further include crystallization materials, reducing agents, and conductive metals. The solid portion of the enamel composition is considered to be the glass frit portion, the pigment, the crystallization material, the reducing agents, and the metals, taken together.

The enamel compositions can include any suitable amount of the frit portion. In one embodiment, the enamel compositions include about 60 to about 85 wt % of the frit portion. In another embodiment, the enamel compositions include about 65 to about 83 wt % of the frit portion. In yet another embodiment, the enamel compositions include about 70 to about 80 wt % of the frit portion.

In one embodiment, the glass enamel compositions are formulated with conductive metals such as silver (e.g., silver particles) in order to provide conductive coatings for use, for example, as defrost circuits for automotive blacklites and windshield. In such areas of utility, color maintenance, bond strength, solderability, absence of silver migration and abrasion resistance are required performance characteristics. It is to be noted that the compositions containing the subject glass frits are applicable for use in conjunction with such conductive coatings for the above noted areas of utility. When the conductive coatings are applied in overlapping relationship with the enamels containing the glass frits, performance improvements as observed after heat treatment can include good resistance to silver migration into the enamel, substantial reduction of undesirable blue haze of the buss bar and performance of solder connections.

In one embodiment, when the enamel compositions include silver metal, the enamel compositions include about 10 to about 60 wt % of the silver metal. In another embodiment, the enamel compositions include about 15 to about 55 wt % of the silver metal. In yet another embodiment, the enamel compositions include about 20 to about 50 wt % of the silver metal.

Organic Vehicle

The glass frits and enamel compositions can be combined with a vehicle. The glass frits can be combined with the vehicle to form a printable enamel paste (e.g., printable enamel paste). The vehicle to be employed in the paste can be selected on the basis of its end use application. In one embodiment, the vehicle adequately suspends the particulates and burn off completely upon firing of the paste on the substrate. Vehicles are typically organic. Examples of organic vehicles include compositions based on pine oils, vegetable oils, mineral oils, low molecular weight petroleum fractions, tridecyl alcohols, synthetic and natural resins, and the like. In another embodiment, surfactants and/or other film forming modifiers can also be included.

The specific vehicle and amounts employed are selected based upon the specific components of the paste and the desired viscosity. The enamel paste in general can contain from about 60 to about 85 wt % solids as above described, more preferably about 65 to about 83 wt % and about 15 to about 40 wt % of the suitable organic vehicle, more preferably about 17 to about 35 wt %.

The viscosity of the paste can be adjusted depending on application techniques on a substrate such as screen printing, roll coating or spraying. The vehicles can be modified by viscous resins such as vinyl resins, solvents, film formers such as cellulosic materials, and the like. For purposes of screen-printing, viscosities ranging from 10,000 to 80,000 and preferably 35,000 to 65,000 centipoises at 20° C., as determined on a Brookfield Viscometer, #7 spindle at 20 rpm, are appropriate.

Pigment

In certain embodiments, the glass frit can be combined with a pigment, such as a mixed metal oxide pigment. When used, such pigments generally constitute no greater than about 30 wt %, preferably 0.1-30 wt %, more preferably 1-25 wt %, still more preferably 2-20 wt %, of the glass enamel compositions herein, depending upon the range of color, gloss, and opacity (e.g., transmittance) desired.

Keeping in mind the general preference for completely lead-free and cadmium-free compositions for some applications such as food and beverages, useful pigments may come from several of the major classifications of complex inorganic pigments, including corundum-hematite, olivine, priderite, pyrochlore, rutile, spinel, and spinel. Other categories such as baddeleyite, borate, garnet, periclase, phenacite, phosphate, sphene and zircon may be suitable in certain applications.

The glass frit (e.g., finely ground glass frit) can be combined with pigments such as a mixed metal oxide pigment, any other type of metal powder, metal resonate, or other material of choice. Typical complex metal oxide pigments used to produce black colors in the automotive industry would include oxides of copper, chrome, iron, cobalt, nickel, manganese, and the like. Although these black spinel pigments are preferred for use in the automotive industry, other metal oxide pigments to produce other various colors can be combined with the glass frit compositions in this invention. Examples of other end uses include architectural, appliance, and beverage industries.

Examples of commercially available pigments include $CuCr_2O_4$, $(Co,Fe)(Fe,Cr)_2O_4$, (NiMnCrFe), and the like. Specific examples available from Ferro Corporation, Washington, Pa. include pigments having the following Ferro Corporation product numbers: 2980 which is a cobalt chromium iron black pigment and V792 pigment which is a nickel manganese iron chromium black pigment.

Crystalline Material

The enamel compositions can contain solids of crystalline seed materials along with the frit compositions herein to promote crystallization. Examples of crystalline seed materials include zinc silicates, aluminum silicate, zinc borates, zinc titanates, bismuth silicate and combinations thereof. Specific examples of crystalline seed materials include $Zn_2SiO_4$, $2ZnO.3TiO_2$, $ZnTiO_3$, $ZnO.B_2O_3$, $3ZnO.B_2O_3$, and $5ZnO.2B_2O_3$. Further information on crystalline materials can be found in, for example, U.S. Pat. No. 5,153,150 and U.S. Pat. No. 5,714,420 patents, which are hereby incorporated by reference. In one embodiment, the enamel compositions include zinc silicate (such as $Zn_2SiO_4$) or bismuth silicate (such as $Bi_2SiO_4$). In another embodiment, the enamel compositions include product number 2099, which is a zinc silicate seed material or product number 2077, which is a bismuth silicate seed material and commercially available at Ferro Corporation, Washington, Pa.

The enamel compositions can include any suitable amount of the solids of crystalline seed materials. In one embodiment, the enamel compositions include about 0.1 to about 20 wt %, preferably about 0.5 to about 10 wt %, and more preferably about 1 to about 5 wt % of at least one crystalline material. The crystalline seed material can yield anti-stick properties advantageous in press-bend forming operations such as those used in the automotive glass industry.

Reducing Agent

In certain embodiments, the enamel compositions include a reducing agent. For example, the enamel compositions include metals such as silicon, added separately from any oxide, in an amount of about 0.1 to about 5 wt %, preferably about 0.5 to about 4.5 wt % more preferably about 1 to about 4 wt %. Silicon metal is a reducing agent which prevents or minimizes the extent of oxidation, especially of silver metal in conductive traces. Sulfides also can act as reducing agents. Such reducing agents have the desired effect of preventing or minimizing the extent of silver migration into a glass substrate or coating. Other metals that enhance the desired properties of the glass enamels herein or at a minimum, do not degrade such desired properties, are also envisioned herein. For example, metals from which the oxides used in the frits or pigments herein may be used, keeping in mind the preferences for low or essentially zero levels of heavy metals such as lead and cadmium.

In one embodiment, the solid portions include about 30 to about 95 wt % of the frit portion; about 0.1 to about 30 wt % pigment; about 0.1 to about 15 wt % crystalline material; about 10 to about 60 wt % silver; and optionally about 0.1 to about 5 wt % reducing agent.

Dispersing Surfactant

In certain embodiments, the enamel compositions include a dispersing surfactant. The dispersing surfactant assists in pigment wetting, when an insoluble particulate inorganic pigment is used. A dispersing surfactant typically contains a block copolymer with pigment affinic groups. Examples of surfactants include surfactants sold under the Disperbyk® and Byk® trademarks by Byk Chemie of Wesel, Germany, such as Disperbyk 162 and 163, which are solutions of high molecular weight block copolymers with pigment affinic groups, and a blend of solvents (xylene, butylacetate and methoxypropylacetate). Disperbyk 162 has these solvents in a 3/1/1 ratio, while the ratio in Disperbyk 163 is 4/2/5. Disperbyk 140 is a solution of alkyl-ammonium salt of an acidic polymer in a methoxypropylacetate solvent.

Rheological Modifier

In certain embodiments, the enamel compositions include a rheological modifier. The rheological modifier can be used to adjust the viscosity of the enamel composition. A variety of rheological modifiers can be used. Examples of rheological modifiers include those sold under the Byk®, Disperplast®, and Viscobyk® trademarks, available from Byk Chemie. They include, for example, BYK 400 series, such as BYK 411 and BYK 420, (modified urea solutions); BYK W-900 series, (pigment wetting and dispersing additives); Disperplast series, (pigment wetting and dispersing additives for plastisols and organosols); and Viscobyk series, (viscosity depressants for plastisols and organosols).

Flow Aid

In certain embodiments, the enamel compositions include a flow aid. The flow aid is an additive used to control the viscosity and rheology of enamel compositions, which affects the flow properties of liquid systems in a controlled and predictable way. Rheology modifiers are generally considered as being either pseudoplastic or thixotropic in nature. Examples of flow aids include those sold commercially under the Additol®, Multiflow®, and Modaflow® trademarks by UCB Surface Specialties of Smyrna, Ga. Specific examples include Additol VXW 6388, Additol VXW 6360, Additol VXL 4930, Additol XL 425, Additol XW 395, Modaflow AQ 3000, Modaflow AQ 3025, Modaflow Resin, and Multiflow Resin.

Adhesion Promoter

In certain embodiments, the enamel compositions include an adhesion promoter. Adhesion promoting polymers can be used to improve the compatibility between a substrate and enamel. Examples of adhesion promoters include those sold by GE Silicones of Wilton, Conn. under the Silquest®, CoatOSil®, NXT®, XL-Pearl™ and Silcat® trademarks, including the following product numbers, sold under the Silquest® trademark: A1101, A1102, A1126, A1128, A1130, A1230, A1310, A162, A174, A178, A187, A2120. For example, Silquest® A-187 is (3-glycidoxypropyl) trimethoxysilane, which is an epoxysilane adhesion promoter.

Stabilizers

In certain embodiments, the enamel compositions include light or UV stabilizers. Light or UV stabilizers are classified according to their mode of action: UV blockers—that act by shielding the substrate from ultraviolet light; or hindered amine light stabilizers (HALS)—that act by scavenging the radical intermediates formed in a photo-oxidation process. In one embodiment, the compositions of the invention include about 0.1 to about 2 wt % of a light stabilizer, preferably about 0.5 to about 1.5%, and further include about 0.1 to about 4 wt % of a UV blocker, preferably about 1 to about 3 wt %.

Examples of Light stabilizers and UV blockers include those sold under the Irgafos®, Irganox®, Irgastab®, Uvitex®, and Tinuvin® trademarks by from Ciba Specialty Chemicals, Tarrytown, N.Y., including product numbers 292 HP, 384-2, 400, 405, 411L, 5050, 5055, 5060, 5011, all using the Tinuvin trademark. Suitable UV blocking agents include Norbloc 7966 (2-(2' hydroxy-5' methacryloxyethylphenyl)-2H-benzotriazole); Tinuvin 123 (bis-(2,2,6,6-tetramethyl-1-(octyloxy)-4-piperidinyl)ester); Tinuvin 99 (3-(2H-benzotriazole-2-yl)5-(1,1-dimethyl ethyl)-4-hydroxybenzenepropanoic acid, C7-9-branched alkyl esters) Tinuvin 171 (2-(2H-benzotriazol-2-yl)-6-dodecyl-4-methyl-phenol). Products sold under the Norbloc® trademark are available from Janssen Pharmaceutica of Beerse, Belgium. Suitable hindered amine light stabilizers (HALS) are sold by the Clariant Corporation, Charlotte, N.C., under the Hostavin® trademark, including Hostavin 845, Hostavin N20, Hostavin N24, Hostavin N30, Hostavin N391, Hostavin PR31, Hostavin ARO8, and Hostavin PR25.

Substrate

The invention can provide a substrate having fired thereon an enamel compositions (e.g., enamel paste) of the invention. Any suitable substrate can be used in the subject invention. Examples of substrates include glass, ceramic or other non-porous substrates. Specific examples of substrates include an automotive glass substrate, architectural glass, appliances, LED's (light emitting diodes), solar substrates, electronic sensor devices, and beverage containers.

Method of Forming Enamel on Substrate

To prepare the enamel compositions of the invention, the necessary frit or frits are ground to a fine powder using conventional techniques including milling. The frit component is then combined with the other solids components. The solids are then mixed with the necessary vehicle to form the enamel paste. The viscosity is adjusted as desired.

Once the enamel paste is prepared, it can be applied to the substrate by any suitable technique. The enamel paste can be applied by screen printing, decal application, spraying, brushing, roller coating or the like. Screen printing can be preferred when the paste is applied to a glass substrate.

After application of the paste to a substrate in a desired pattern, the applied coating is then fired to adhere the enamel to the substrate. The firing temperature is generally determined by the frit maturing temperature, and preferably is in a broad temperature range. Typically, the firing range is in the range of about 1000° to about 1250° F., more preferably in the range of about 1020° to about 1200° F., and most preferably about 1040° to about 1150° F.

A glass substrate can be colored and/or decorated by applying any enamel composition described herein to at least a portion of a substrate, for example, a glass substrate such as a glass sheet, or automotive glass, (e.g., windshield). An enamel composition can be applied in the form of a paste as disclosed herein. Glass, ceramic or other non-porous substrates can also be sealed hermetically together using enamel compositions described herein.

In one embodiment, the method of forming an enamel composition involves combining: about 30 to about 50 wt % of $SiO_2$; about 4.5 to about 20.2 wt % of $Cs_2O$; about 6.1 to about 11.5 wt % of $Na_2O$; about 6.5 to about 20.2 wt % of $B_2O_3$; about 8 to about 25 wt % of ZnO; about 3.4 to about 12.3 wt % of $TiO_2$; about 0 to about 40 wt % of $Bi_2O_3$; and about 0 to about 7 wt % of F. In another embodiment, the method of forming an enamel on a substrate involves providing an enamel composition on the substrate, the enamel composition containing a solid portion, the solid portion containing a frit portion, the frit portion containing, prior to firing: about 30 to about 50 wt % of $SiO_2$; about 4.5 to about 20.2 wt % of $Cs_2O$; about 6.1 to about 11.5 wt % of $Na_2O$; about 6.5 to about 20.2 wt % of $B_2O_3$; about 8 to about 25 wt % of ZnO; about 3.4 to about 12.3 wt % of $TiO_2$; about 0 to about 40 wt % of $Bi_2O_3$; and about 0 to about 7 wt % of F; and firing the enamel composition and the substrate at a temperature sufficient to adhere the enamel composition to the substrate. In some applications, preferably, the frit portion and thus the enamel composition is free of bismuth or oxides thereof. Specifically, in applications where the enamel composition is intended for processing in a reducing atmosphere, it may be best if the composition is free of bismuth oxide for the presence of bismuth oxide may lead to the formation of metallic bismuth, which is generally an undesirable result.

The enamel composition can be applied to the entire surface of a substrate, or to only a portion thereof, for example the periphery. The method can involve forming a glass whereby the glass substrate is heated to an elevated temperature and subjected to a forming pressure to bend the glass substrate. In particular, bending the glass substrate can involve heating the glass substrate to an elevated temperature of, for example, at least about 570° C., at least about 600° C., at least about 625° C., or at least about 650° C. Upon heating, the glass is subjected to a forming pressure, e.g., gravity sag or press bending in the range of about 0.1 to about 5 psi, or about 1 to about 4 psi, or typically about 2 to about 3 psi, with a forming die.

EXAMPLES

The following compositions represent exemplary embodiments of the invention. They are presented to explain the invention in more detail, and do not limit the invention. Glass frit compositions and enamel compositions according to the present invention are given in Tables 1-6, Frits 1-27, and Enamels 1-21. The results of the following investigations are shown in Tables 1-6.

The glass frit compositions are produced by mixing together raw materials as shown in Tables 1, 2 and 3. The mixed raw batch compositions are melted at about 2300° F. for about 45 minutes, followed by sudden cooling, using water quenching. The glass compositions are then ground to a fine particle size, preferably between 2 to 6 microns using a ball mill. The finely ground powder frits are then used to form glass enamel compositions.

The enamel compositions are produced by using some of the glass frit compositions and other compositions such as pigments as shown in Tables 4, 5 and 6. The finely ground glass frits are combined with a mixed metal oxide pigment to form enamel compositions. V792 pigment is a nickel manganese iron chrome pigment, 2099 is a zinc silicate seed material and 2077 is a bismuth silicate seed material. Both materials are commercially available at Ferro Corporation, Washington, Pa. Further, the solids of the enamel compositions are dispersed and suspended in a vehicle selected for the end use application to form the enamel paste. Although not shown, the glass frit composition of the present investigation can be employed in producing enamel formulations in the same manner as the frits of Enamels 1-20.

Testing is performed by combining 4.0 grams of the glass frit or enamel composition with a pine oil based vehicle and screen printing the resulting dispersion onto a microscope slide or automotive glass substrate at a wet thickness of 2 mils. The slides or automotive glass substrate are then fired at various temperatures to determine the "firing temperature," FT, or "minimum firing temperature," MF. The FT is the temperature where the glass has sufficient time to flow and fuse within a 15 minute fire and yield a glossy smooth surface. The MF is the temperature where the enamel has sufficient time to flow and fuse in a 3 minute fire and yield an enamel without interconnected porosity. Preheat time is 10 and 3 minutes at 800° F. for FT and MF, respectively.

A thermal expansion coefficient (TEC) is determined from 25° C. to 300° C. using an Orton model 1000R dilatometer. The TEC is reported in the temperature range of 25° C. to 325° C. and has units of $10^{-6}$° C.$^{-1}$. Glass transition temperatures ($T_g$) and dilatometric softening temperatures ($T_d$) are measured using the dilatometer.

Residual stress in transparent glass that results from enamel coatings is measured by utilizing ASTM C-978-87. The technique uses polarized light and a quartz wedge attachment with an integral polarizer. A cross section of enamel coated glass with 0.25 inches wide section having mutually perpendicular sides is prepared. These samples are annealed at 1020° F. for 15 minutes and used for stress measurements.

Gloss measurement of fired glass enamels are recorded at an angle of incident 45° using Gardco Novogloss instrument. All trials are fired at test temperatures for 3 minutes with no preheat and gloss values are recorded.

Room temperature chemical durability is determined for 10 wt % citric acid, 10 wt % hydrochloric acid, and 4 wt % acetic acid solutions. The acid resistance is evaluated by utilizing ASTM C724-91. Fired trials are exposed to the 10 wt % citric acid solution for 15 minutes at room temperature, 10 wt % hydrochloric acid solution for 10 minutes at room temperature, and 4 wt % acetic acid solution for 1 minute at room temperature. They are graded according to the following scale:

Grade 1—No apparent attack

Grade 2—Appearance of iridescence or visible stain on the exposed surface when viewed at an angle of 45°, but not apparent when viewed at angles less than 30°.

Grade 3—A definite stain which does not blur reflected images and is visible at angles less than 30°.

Grade 4—Definite stain with a gross color change or strongly iridescent surface visible at angles less than 30° and which may blur reflected images.

Grade 5—Surface dull or matte with chalking possible.

Grade 6—Significant removal of enamel with pinholing evident.

Grade 7—Complete removal of enamel in exposed area.

TABLE 1

Glass frit formulations in wt %, firing temperatures, and properties

| Oxides (wt. %) | 1 | 2 | 3 | 4 | 5 | 6 |
|---|---|---|---|---|---|---|
| $SiO_2$ | 36.6 | 36.6 | 34.5 | 35.5 | 36.6 | 36.6 |
| $Na_2O$ | 11.2 | 9.6 | 10.5 | 11 | 11.2 | 11.2 |
| $Cs_2O$ | 9.8 | 10.5 | 12.5 | 5.6 | 9.3 | 8.5 |
| $Al_2O_3$ | 1 | 2.5 | 2 | 3.4 | 1.5 | 3.5 |
| $B_2O_3$ | 12.8 | 14.3 | 14.5 | 18 | 14.1 | 13.9 |
| ZnO | 14.3 | 16.5 | 14.8 | 16 | 12 | 11 |
| $TiO_2$ | 9.3 | 7.4 | 7.4 | 5.4 | 10.3 | 10.3 |
| F | 5 | 2.6 | 3.8 | 5.1 | 5 | 5 |
| TEC (25-325°) C. | 8.38 | 8.12 | 8.53 | 8 | 8.33 | 8.2 |
| $T_g$ (° C.) | 461 | 470 | 453 | 444 | 454 | 447 |
| $T_d$ (° C.) | 504 | 511 | 504 | 493 | 509 | 496 |
| Firing Temperature (F.) | 1080 | 1080 | 1060 | 1070 | 1080 | 1090 |
| 10% citric Acid | 3 | 2-3 | 5 | 3-4 | 2-3 | 3-4 |
| 10% hydrochloric acid | 3-4 | 3 | 5 | 3-4 | 3 | 3-4 |
| 4% acetic acid | 1-2 | 1-2 | 2-3 | 2-3 | 1-2 | 1-2 |
| Stress (psi) | 33 | 121 | 67 | 236 | 32 | 32 |

TABLE 2

Glass frit formulations in wt %, firing temperatures, and properties

| Oxides (wt. %) | 7 | 8 | 9 | 10 | 11 | 12 | 13 | 14 | 15 | 16 | 17 | 18 |
|---|---|---|---|---|---|---|---|---|---|---|---|---|
| $SiO_2$ | 40.5 | 37 | 38.5 | 37.5 | 32 | 34 | 36.6 | 36.6 | 36.6 | 35.6 | 35.7 | 36.6 |
| $Na_2O$ | 8.5 | 8.5 | 8.5 | 8.5 | 8.5 | 8.5 | 9 | 10 | 9.6 | 11.1 | 9.8 | 11.2 |
| $Cs_2O$ | 6.5 | 8.5 | 10.5 | 12.5 | 13.5 | 16.5 | 5.4 | 7.8 | 6.5 | 3.5 | 7.8 | 9.3 |
| BaO | 2 | 2 | 2 | 2 | 2 | 2 | 0 | 0 | 0 | 0 | 0 | 0 |
| $Al_2O_3$ | 3.6 | 3.6 | 3.6 | 3.6 | 3.6 | 3.6 | 1 | 1 | 2.5 | 1.5 | 3.4 | 2.5 |
| $B_2O_3$ | 8 | 8 | 8 | 8 | 8 | 8 | 19.4 | 16 | 16.3 | 19 | 20 | 12.6 |
| ZnO | 20.5 | 22 | 18.5 | 17.5 | 22 | 22 | 14.3 | 14.3 | 18.5 | 14.3 | 17 | 12.5 |
| $TiO_2$ | 5.4 | 5.4 | 5.4 | 5.4 | 5.4 | 5.4 | 9.3 | 9.3 | 7.4 | 9.3 | 0 | 10.3 |
| F | 0 | 0 | 0 | 0 | 0 | 0 | 5 | 5 | 2.6 | 5.7 | 6.3 | 5 |
| $CeO_2$ | 0.5 | 0.5 | 0.5 | 0.5 | 0.5 | 0 | 0 | 0 | 0 | 0 | 0 | 0 |
| $MnO_2$ | 0.5 | 0.5 | 0.5 | 0.5 | 0.5 | 0 | 0 | 0 | 0 | 0 | 0 | 0 |
| $La_2O_3$ | 1 | 1 | 1 | 1 | 1 | 0 | 0 | 0 | 0 | 0 | 0 | 0 |
| $MoO_3$ | 1 | 1 | 1 | 1 | 1 | 0 | 0 | 0 | 0 | 0 | 0 | 0 |
| $Nb_2O_5$ | 1 | 1 | 1 | 1 | 1 | 0 | 0 | 0 | 0 | 0 | 0 | 0 |
| TEC (25-325°) C. | 7.46 | 8.14 | 7.71 | 8.66 | 9.39 | 9.04 | 8.32 | 8.16 | 7.5 | 8.37 | 8.11 | 8.47 |
| $T_g$ (° C.) | 515 | 510 | 508 | 507 | 499 | 498 | 442 | 447 | 474 | 439 | 426 | 444 |
| $T_d$ (° C.) | 568 | 556 | 562 | 558 | 544 | 543 | 505 | 497 | 522 | 501 | 485 | 500 |
| Firing Temperature (F.) | 1160 | 1140 | 1140 | 1140 | 1130 | 1120 | 1120 | 1100 | 1100 | 1100 | 1090 | 1090 |
| 10% citric Acid | 1 | 1 | 1 | 1-2 | 4-5 | 4-5 | 2-3 | 2-3 | 3-4 | 3-4 | 5 | 3-4 |

TABLE 2-continued

Glass frit formulations in wt %, firing temperatures, and properties

| Oxides (wt. %) | 7 | 8 | 9 | 10 | 11 | 12 | 13 | 14 | 15 | 16 | 17 | 18 |
|---|---|---|---|---|---|---|---|---|---|---|---|---|
| 10% hydrochloric acid | 1 | 3 | 2-3 | 3 | 4-5 | 5 | 2-3 | 3-4 | 3-4 | 3-4 | 5 | 3-4 |
| 4% acetic acid | 1 | 1 | 1 | 1 | 2-3 | 2-3 | 1-2 | 1-2 | 1-2 | 2-3 | 2 | 1-2 |

TABLE 3

Glass frit formulations in wt %, firing temperatures, and properties

| Oxides (wt. %) | 19 | 20 | 21 | 22 | 23 | 24 | 25 | 26 | 27 |
|---|---|---|---|---|---|---|---|---|---|
| $SiO_2$ | 36.7 | 36.6 | 32.9 | 36.9 | 37.9 | 28.8 | 39.7 | 37.5 | 36.0 |
| $Na_2O$ | 9.0 | 4.5 | 2.5 | 3.5 | 5.5 | 2 | 7 | 7 | 7 |
| $Cs_2O$ | 8.5 | 9.3 | 9.3 | 9.3 | 7.3 | 7.3 | 10.85 | 9.05 | 6.05 |
| $Li_2O$ | 1.5 | 1 | 1 | 1 | 1 | 1 | 1.2 | 1.2 | 1.2 |
| $K_2O$ | 0 | 0.8 | 0.8 | 0.8 | 0.8 | 0.8 | 0.8 | 0.8 | 0.8 |
| $Bi_2O_3$ | 0 | 15 | 25 | 20 | 10 | 30 | 4 | 8 | 12 |
| $Al_2O_3$ | 3 | 1.5 | 1.5 | 1.5 | 1.5 | 1.5 | 1.75 | 1.75 | 1.75 |
| $B_2O_3$ | 13 | 14 | 12 | 10 | 16 | 12 | 14 | 14 | 14 |
| ZnO | 13 | 4 | 2 | 2 | 6 | 4 | 10 | 10 | 10 |
| $TiO_2$ | 10.3 | 8.3 | 7.3 | 9.3 | 8.3 | 10.3 | 4.3 | 4.3 | 4.3 |
| F | 5 | 5 | 5 | 5 | 5 | 3.8 | 5 | 5 | 5 |
| $ZrO_2$ | 0 | 0 | 0 | 0 | 0 | 0 | 0.7 | 0.7 | 0.7 |
| $Y_2O_3$ | 0 | 0 | 0 | 0 | 0 | 0 | 0 | 0 | 0.5 |
| TEC (25-325°) C. | 9.34 | 8.93 | 8.74 | 9.13 | 8.78 | 7.7 | 9.45 | 9.54 | 9.26 |
| $T_g$ (° C.) | 434 | 434 | 431 | 434 | 433 | 428 | 435 | 425 | 425 |
| $T_d$ (° C.) | 472 | 471 | 493 | 500 | 478 | 504 | 466 | 468 | 470 |
| Firing Temperature (F.) | 1020 | 1020 | 1020 | 1030 | 1030 | 1100 | 1020 | 990 | 990 |
| 10% Citric Acid | 3 | 3-4 | 2-3 | 2-3 | 3-4 | 1 | 4 | 5 | 5 |
| 10% hydrochloric acid | 3-4 | 4-5 | 3-4 | 2 | 4-5 | 1 | 4-5 | 5-6 | 5 |
| 4% acetic acid | 1-2 | 1-2 | 2-3 | 1-2 | 2-3 | 1 | 2-3 | 3 | 2-3 |

TABLE 4

Black enamel formulations in wt %, firing data, and acid resistance performance data for pastes made with selected frits from Table 1.

| Oxides (wt. %) | Enamel-1 | Enamel-2 | Enamel-3 | Enamel-4 | Enamel-5 | Enamel-6 | Enamel-7 | Enamel-8 |
|---|---|---|---|---|---|---|---|---|
| Frit-1 | 75 | 0 | 0 | 0 | 0 | 0 | 0 | 0 |
| Frit-2 | 0 | 75 | 0 | 0 | 0 | 0 | 0 | 0 |
| Frit-3 | 0 | 0 | 75 | 0 | 0 | 0 | 0 | 0 |
| Frit-4 | 0 | 0 | 0 | 75 | 0 | 0 | 0 | 0 |
| Frit-5 | 0 | 0 | 0 | 0 | 75 | 0 | 70.75 | 0 |
| Frit-6 | 0 | 0 | 0 | 0 | 0 | 75 | 0 | 70.75 |
| *V-792 | 25 | 25 | 25 | 25 | 25 | 25 | 23.58 | 23.58 |
| *2099 | 0 | 0 | 0 | 0 | 0 | 0 | 5.66 | 5.66 |
| Minimum Firing Temperature (F.) | 1160 | 1160 | 1140 | 1140 | 1160 | 1150 | 1200 | 1180 |
| 10% citric acid | 3 | 2-3 | 5 | 3-4 | 2-3 | 3-4 | 4 | 4 |
| 10% hydrochloric | 3-4 | 3 | 5 | 3-4 | 3 | 3-4 | 4 | 4 |
| 4% acetic acid | 1-2 | 1-2 | 2-3 | 2-3 | 1-2 | 1-2 | 2 | 2 |

TABLE 5

Black enamel formulations in wt %, firing data, and acid resistance performance data for pastes made with selected frits from Table 3.

| Oxides (wt. %) | Enamel-9 | Enamel-10 | Enamel-11 | Enamel-12 | Enamel-13 | Enamel-14 | Enamel-15 |
|---|---|---|---|---|---|---|---|
| Frit-20 | 75 | 0 | 0 | 0 | 0 | 73 | 0 |
| Frit-21 | 0 | 75 | 0 | 0 | 0 | 0 | 0 |
| Frit-23 | 0 | 0 | 75 | 0 | 37.5 | 0 | 74 |
| Frit-24 | 0 | 0 | 0 | 75 | 37.5 | 0 | 0 |
| *V-792 | 25 | 25 | 25 | 25 | 25 | 21 | 20 |
| *2077 | 0 | 0 | 0 | 0 | 0 | 4 | 4 |
| Si-metal | 0 | 0 | 0 | 0 | 0 | 2 | 2 |

TABLE 5-continued

Black enamel formulations in wt %, firing data, and acid resistance performance data for pastes made with selected frits from Table 3.

| Oxides (wt. %) | Enamel-9 | Enamel-10 | Enamel-11 | Enamel-12 | Enamel-13 | Enamel-14 | Enamel-15 |
|---|---|---|---|---|---|---|---|
| Minimum Firing Temperature (F.) | 1090 | 1060 | 1110 | 1190 | 1160 | 1140 | 1130 |
| 10% citric acid | 3-4 | 2-3 | 3-4 | 2 | 2-3 | 3 | 3 |
| 10% hydrochloric | 4-5 | 2 | 4-5 | 2-3 | 3 | 3-4 | 4 |
| 4% acetic acid | 1-2 | 1-2 | 1-2 | 1 | 1-2 | 1-2 | 1-2 |

TABLE 6

Black enamel formulations in wt % and gloss at 45° with selected frits from Table 1 and Table 3.

| Oxides (wt. %) | Enamel-16 | Enamel-17 | Enamel-18 | Enamel-19 | Enamel-20 | Enamel-21 |
|---|---|---|---|---|---|---|
| Frit-5 | 70.75 | 0 | 73.5 | 0 | 0 | 0 |
| Frit-6 | 0 | 70.75 | 0 | 73.5 | 0 | 0 |
| Frit-20 | 0 | 0 | 0 | 0 | 76 | 76 |
| Frit-23 | 0 | 0 | 0 | 0 | 0 | 0 |
| V-792 | 23.58 | 23.58 | 24.5 | 24.5 | 20 | 20 |
| 2099 | 5.66 | 5.66 | 1.96 | 1.96 | 0 | 0 |
| 2077 | 0 | 0 | 0 | 0 | 4 | 4 |
| Gloss at 1250° F. | 25.2 | 27.6 | 26.7 | 29.7 | 76.5 | 72.2 |
| Gloss at 1275° F. | 28.8 | 33.8 | 45.3 | 33.2 | 80.2 | 84.2 |
| Gloss at 1300° F. | 40.0 | 37.1 | 49.1 | 43.6 | 73.1 | 85.1 |
| Gloss at 1325° F. | 49.0 | 40.4 | 50.8 | 43.5 | 71.7 | 80.2 |

These results demonstrate the excellent performance characteristics of the glass frits and enamel compositions of the present invention, and particularly the low firing temperature, good chemical durability and thermal expansion characteristics.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the terms "contain," "have," "include," and "involve" are used in either the detailed description or the claims, such terms are intended to be inclusive in a manner similar to the term "comprising" as "comprising" is interpreted when employed as a transitional word in a claim. In some instances, however, to the extent that the terms "contain," "have," "include," and "involve" are used in either the detailed description or the claims, such terms are intended to be partially or entirely exclusive in a manner similar to the terms "consisting of" or "consisting essentially of" as "consisting of" or "consisting essentially of" are interpreted when employed as a transitional word in a claim.

What is claimed is:

1. An enamel composition comprising a solid portion comprising a frit portion, the frit portion comprising, prior to firing:
    about 30 to about 50 wt % of $SiO_2$;
    about 4.5 to about 20.2 wt % of $Cs_2O$;
    about 6.1 to about 11.5 wt % of $Na_2O$;
    about 6.5 to about 20.2 wt % of $B_2O_3$;
    about 8 to about 25 wt % of ZnO;
    about 3.4 to about 12.3 wt % of $TiO_2$;
    about 0 to about 40 wt % of $Bi_2O_3$; and
    about 0 to about 7 wt % of F.

2. The enamel composition of claim 1, wherein the frit portion comprises:
    about 32 to about 48 wt % of $SiO_2$;
    about 5.5 to about 18.5 wt % of $Cs_2O$;
    about 7.5 to about 11.3 wt % of $Na_2O$;
    about 7.5 to about 18.5 wt % of $B_2O_3$;
    about 9 to about 23 wt % of ZnO;
    about 4.3 to about 11.3 wt % of $TiO_2$;
    about 5 to about 35 wt % of $Bi_2O_3$; and
    about 1.5 to about 6.5 wt % of F.

3. The enamel composition of claim 1, wherein the frit portion comprises:
    about 34 to about 38 wt % of $SiO_2$;
    about 6.5 to about 16.5 wt % of $Cs_2O$;
    about 8.5 to about 11.1 wt % of $Na_2O$;
    about 8 to about 16.5 wt % of $B_2O_3$;
    about 10 to about 20 wt % of ZnO;
    about 5.5 to about 10.3 wt % of $TiO_2$;
    about 10 to about 20 wt % of $Bi_2O_3$; and
    about 2.5 to about 5.5 wt % of F.

4. The enamel composition of claim 1, wherein the frit portion further comprises at least one selected from the group consisting of:
    about 0.1 to about 1 wt % of $La_2O_3$;
    about 0.1 to about 1 wt % of $Nb_2O_5$;
    about 0.1 to about 1 wt % of $MnO_2$;
    about 0.1 to about 1 wt % of $CeO_2$;
    about 0.1 to about 1 wt % of $MoO_3$; and
    about 0.1 to about 1 wt % of $WO_3$, and
    a total amount of the oxides is about 0.1 to about 5 wt % of the frit portion.

5. The enamel composition of claim 1, wherein the frit portion further comprises at least one selected from the group consisting of:
    about 0.1 to about 4 wt % of $Al_2O_3$; and
    about 0.1 to about 3 wt % of BaO.

6. The enamel composition of claim 1, further comprising at least one crystalline seed material selected from the group consisting of zinc borates, zinc silicates, zinc titanates, bismuth silicates and combinations thereof.

7. The enamel composition of claim 1 further comprising pigments.

8. The enamel composition of claim 1, wherein the enamel composition is lead-free and cadmium-free.

9. The enamel composition of claim 1, wherein the frit portion has about $8.5 \times 10^{-6}$ °C.$^{-1}$ or less of thermal expansion coefficient.

10. The enamel composition of claim 1, wherein the frit portion has about 1100° F. or less of firing temperature.

11. The enamel composition of claim 1, wherein the solid portion comprises:
   about 60 to about 85 wt % of the frit portion;
   about 0.1 to about 30 wt % of pigments;
   about 0.1 to about 15 wt % of crystalline materials;
   about 10 to about 60 wt % of silver; and optionally
   about 0.1 to about 5 wt % of reducing agents.

12. A method of forming an enamel composition, comprising:
   combining:
   about 30 to about 50 wt % of $SiO_2$;
   about 4.5 to about 20.2 wt % of $Cs_2O$;
   about 6.1 to about 11.5 wt % of $Na_2O$;
   about 6.5 to about 20.2 wt % of $B_2O_3$;
   about 8 to about 25 wt % of ZnO;
   about 3.4 to about 12.3 wt % of $TiO_2$;
   about 0 to about 40 wt % of $Bi_2O_3$; and
   about 0 to about 7 wt % of F.

13. The method of claim 12, further comprising:
   combining at least one selected from the group consisting of:
   about 0.1 to about 1 wt % of $La_2O_3$;
   about 0.1 to about 1 wt % of $Nb_2O_5$;
   about 0.1 to about 1 wt % of $MnO_2$;
   about 0.1 to about 1 wt % of $CeO_2$;
   about 0.1 to about 1 wt % of $MoO_3$; and
   about 0.1 to about 1 wt % of $WO_3$.

14. The method of claim 12, further comprising:
   combining at least one selected from the group consisting of:
   about 0.1 to about 4 wt % of $Al_2O_3$; and
   about 0.1 to about 3 wt % of BaO.

15. The method of claim 12, further comprising:
   combining pigments; crystalline materials; optionally silver; and optionally reducing agents.

16. A method of forming an enamel on a substrate, comprising:
   providing an enamel composition on the substrate, the enamel composition comprising a solid portion, the solid portion comprising a frit portion, the frit portion comprising, prior to firing:
   about 30 to about 50 wt % of $SiO_2$;
   about 4.5 to about 20.2 wt % of $Cs_2O$;
   about 6.1 to about 11.5 wt % of $Na_2O$;
   about 6.5 to about 20.2 wt % of $B_2O_3$;
   about 8 to about 25 wt % of ZnO;
   about 3.4 to about 12.3 wt % of $TiO_2$;
   about 0 to about 40 wt % of $Bi_2O_3$; and
   about 0 to about 7 wt % of F; and
   firing the enamel composition and the substrate at a temperature sufficient to adhere the enamel composition to the substrate.

17. The method of claim 16, wherein the frit portion further comprises at least one selected from the group consisting of:
   about 0.1 to about 1 wt % of $La_2O_3$;
   about 0.1 to about 1 wt % of $Nb_2O_5$;
   about 0.1 to about 1 wt % of $MnO_2$;
   about 0.1 to about 1 wt % of $CeO_2$;
   about 0.1 to about 1 wt % of $MoO_3$; and
   about 0.1 to about 1 wt % of $WO_3$, and
   a total amount of the oxides is about 0.5 to about 5 wt % of the frit portion.

18. The method of claim 16, wherein the frit portion further comprising at least one selected from the group consisting of:
   about 0.1 to about 4 wt % of $Al_2O_3$; and
   about 0.1 to about 3 wt % of BaO.

19. The method of claim 16 wherein said enamel composition is bismuth-free.

* * * * *